UNITED STATES PATENT OFFICE.

FRANK S. WASHBURN, OF RYE, NEW YORK, ASSIGNOR TO AMERICAN CYANAMID COMPANY, OF NEW YORK, N. Y., A CORPORATION OF MAINE.

PROCESS OF SINTERING PHOSPHATIC MATERIALS.

1,373,471. Specification of Letters Patent. Patented Apr. 5, 1921.

No Drawing. Application filed July 23, 1920. Serial No. 398,552.

*To all whom it may concern:*

Be it known that I, FRANK S. WASHBURN, a citizen of the United States, residing at Rye, in the county of Westchester and State of New York, have invented certain new and useful Improvements in Processes of Sintering Phosphatic Materials; and I do hereby declare the following to be a full, clear, and exact description of the invention, such as will enable others skilled in the art to which it appertains to make and use the same.

This invention relates to a process of preparing mixtures of phosphate rock and silica, or other phosphatic silicious mixtures preparatory to smelting or fusion in an electric furnace, and which involves sintering, agglomerating or burning the same outside of said furnace. It has for its object to not only improve certain of the methods heretofore proposed, but also, to carry out the sintering and smelting processes in a less costly and in a more satisfactory manner.

With these and other objects in view the invention consists in the novel steps and combination of steps constituting the process all as will be more fully hereinafter disclosed and particularly pointed out in the claims.

In order that the precise invention may be more clearly understood it is said:

In my prior U. S. Patent No. 1,314,229 dated August 6, 1919, I have described and claimed a process of producing phosphoric acid including the charging of successive portions of phosphatic material into an electrically heated furnace, and causing the gases evolved from one portion to rise up through and to burn in the interstices of another portion of the charge. And in my copending application No. 291,528, filed April 21, 1919, and entitled Process of and apparatus for producing phosphoric acid and compounds of the same, I have disclosed a process for producing phosphoric acid by heating to the required high temperature various phosphatic mixtures wherein the evolved gases are burned in a separate furnace to fuse a portion of the charge and the products of combustion are led through another furnace to preheat the oncoming charge.

But in neither of these processes was the present process disclosed, which comprises the sintering of the individual particles of the charge together to produce a porous mass especially adapted for use as charge material in the electric furnace illustrated in said Patent #1,314,229. The especial advantages to be derived from this said sintering process will be readily understood when it is remembered that it is desirable in any process of this type that the mixture to be fused, be properly proportioned, and thoroughly mixed in order to obtain the desired completion of the reaction, so that a maximum quantity of the phosphorus and phosphorous pentoxid be evolved from said mixture. I have also found that it is especially desirable in the case of phosphatic mixtures that the furnace charge, particularly in the case of a furnace of the shaft type, be porous, to permit the ready evolution of the phosphorous gases formed and also to permit their passage up through the charge. Since Florida pebble phosphate and the silicious matrix found therewith are both dense and finely divided, it is almost imperative in order to produce a suitable porous electric furnace charge of these materials that the said materials be agglomerated, or sintered together as hereinafter disclosed. I find, also, in carrying out a smelting process such, for example, as that described in my said Patent No. 1,314,229, the constituents of the charge in passing through the furnace before reaching the reaction zone, are liable to stratify or to separate to such an extent that the beneficial effect of any careful previous mixing is at least liable to be partially overcome. In addition to this, a considerable portion of any finely divided rock and pulverized material present, is liable to be carried away with the evolved gases, and this action not only introduces a loss in the process, but it also contaminates the final product and causes a greater or less trouble in the subsequent absorption equipment. It is for these reasons that it is highly desirable to introduce the charge material into the electric furnace mixed in such a condition that the constituents not only cannot subsequently separate, and thereupon produce unbalanced charges but also in such a condition that any finely divided constituents present will not be carried out of the reacting mixture by the evolved gases. It is also highly desirable to keep the charge porous, or open, so that the gases evolved from the viscous molten material will freely pass up through the entering charge without any undue resistance, and therefore more completely than heretofore. This is the more to be desired since this volume of evolved gases is greatly increased due to the combustion of the added material in the sintered charge.

These much to be desired results are accomplished by following the procedure to be disclosed hereinafter.

Again, it should be observed that in the mining of phosphate rock by the so called placer method and in the subsequent washing and preparation of the material for shipment, a large part of the said material generally consists of silica and silicious matter and is discarded. This discarded portion of the original material mined is in all sizes from say $\frac{1}{32}$ to nearly one inch in diameter, and usually carries with it such considerable quantities of calcium phosphate, or phosphate rock, that for every ton of finished material shipped, there are, say, two tons of calcium phosphate lost on the dumps along with the matrix; and it so happens that this discarded material in most cases, contains considerable portions of both the silica and calcium phosphate required for the carrying out of the processes disclosed in my above mentioned patent and application.

But in attempting to furnace such discarded materials the constituents generally are not in the exact proper proportions for the reaction, and therefore more phosphate rock or silica is often required. When such additions are had, this discarded unground material may be readily sintered and supplied to the electric furnace for smelting. The run of mine material which is also in all sizes of from say $\frac{1}{32}$ to one inch in diameter may also be used for the electric furnace charge after sintering, as it always contains the necessary silica and calcium phosphate, and not infrequently in approximately the proper proportions. This is particularly true of the Florida land pebble phosphates, although a sintering process as hereinafter disclosed, is also useful for many other phosphatic materials after the proper ratio of silica to phosphate has been supplied either in the rock as mined or by subsequent admixtures.

Therefore, in carrying out this invention I may take a carefully proportioned run of the mine mixture of phosphate rock, having the required silica content and heat it in a shaft furnace to a temperature slightly above redness, or thereabout, whereupon I have discovered that an incipient fusion of the coarse unground lumps of materials will so bond them that the resulting lumpy clinker containing the constituents in masses and in the proper proportions will stand the necessary handling, and will remain in a desirable condition for further use in carrying out the electric furnace operations disclosed in my said patent and in my said application above mentioned. The type of sinter thus obtained is found to be in rather large masses of no regular size, as well as loose and porous and eminently suited for producing a suitable open charge for an electric furnace. I prefer to perform this heating and sintering operation by first mixing the silica and phosphate granules or limp with a suitable amount of carbonaceous material such as coke breeze, or coal, or any other material that will on combustion furnish the required heat to carry out the sintering action. This said sintering operation, when performed as a preliminary step to the process of producing phosphorus, or phosphoric acid, by the so called electric furnace process, has the added advantage of dispelling from the raw material certain of the undesirable impurities such as fluorin and carbon dioxid. In the electric furnace both of these impurities require large quantities of power or heat for their removal, but by the procedure just outlined, a part of this heat is supplied by the fuel used in sintering. The fuel to be used in the sintering operation may be either coal, coke, gas or fuel oil, any of which are more economical for the generation of heat than is electricity. Aside from this, any fluorin evolved is a very corrosive material, and its partial evolution at this point of the procedure greatly simplifies the absorption and collecting of the evolved phosphorus.

This said sintering operation may be carried out in various types of apparatus, such for example, as a rotary kiln, hearth furnace, or any of the many well known types of sintering equipment adapted to such an operation.

It will be clear now that in the preferred procedure I first secure the proper proportions of silica and calcium phosphate in the charge, as by adding some high grade phosphate rock to a silicious material, or I secure some matrix or run of mine material of the right composition and in its unground condition, or I add the required amount of sand to the phosphate rock to be used. With this properly proportioned material, I next preferably add enough carbonaceous material in the form of coal, or coke, to furnish on combustion the heat required for the sintering or agglomerating step of the process. I then preferably moisten this material with a small quantity of water if the mixture is not already sufficiently wet, and subject this moist material to the action of heat and a blast of air, so that the carbon will be ignited and burned to produce most of the heat required to sinter the constituents together into large masses of an irregular shape. I may perform this sintering operation by feeding into a furnace first the fuel in a thin layer, and later upon ignition of the fuel, I may cover this layer with a superimposed layer of the unground moist silica and phosphate mixture and supply the air required. In this way I have found that it is not in all cases essential to premix all of the materials forming the charge.

The same results may be accomplished by first putting down a layer of the phosphate and silica mixture and placing upon this layer a layer of the fuel, igniting the fuel and supplying the air required for sintering. In the first case where I have the fuel underneath the phosphate and silica mixture, I preferably bring the air in beneath the charge, and in the latter case where I place the fuel above the silica and phosphate mixture, I preferably supply the air from above, so that the heat is carried down through the mixture. In any case I may supply the heat required for ignition of the fuel by either a gas, oil, or coal flame. After the burning is complete I then remove the material in the form of large irregular masses from the furnace. This clinkered material is now ready to be used in an electric furnace in connection with the processes heretofore pointed out, and owing to its porous nature the evolved phosphorus escapes therefrom so much more freely than from the charge heretofore employed, that the efficiency of the entire procedure is increased. The quantity of fuel required to add to the silica and phosphate mixture is usually not in excess of ten per cent. of the total weight and may be of any cheap grade of coal or coke so that its cost is comparatively a small item.

It is obvious that this process may be carried out with various grades of phosphatic materials and various kinds of silicious materials and under various conditions of temperature, and preparation of raw materials as for example instead of silica I may use clay, crushed feldspar, crushed quartz, or any of the many other varieties of silicious materials. It is also obvious that I may perform this sintering operation by the use of externally applied heat or the combustion of carbonaceous materials mixed in with the other ingredients. It is further obvious that those skilled in the art may vary several of the steps constituting the process, as well as the materials used without materially departing from the spirit of the invention, and I, therefore, do not wish to be limited to the above disclosure except as may be required by the claims.

The special invention according to my procedure as described here consists in the following: I take finely divided phosphate rock, finely divided silicious material, with particular reference to the natural occurrence of these materials in the Florida land pebble district, and prepare them in suitable shape for charging into an electric shaft furnace. Since the conditions existing in such shaft furnace when producing phosphoric acid from phosphate rock are very decidedly different from those existing in, for example, iron blast furnaces, inasmuch as in the phosphate furnace we carry essentially an oxidizing atmosphere throughout the portion of the shaft containing the phosphate rock and silicious flux, I am essentially precluded from using a carbonaceous or pitch binder, such as is in common practice in briqueting. I am also precluded in such a furnace from using many of the ordinary volatile binders, as well as basic binders such as lime. The preparation of briquets of suitable composition from phosphate pebble and silicious material is so difficult that I was forced to turn to another method of preparing my furnace charge in the loose open agglomerated texture required by the shaft furnace to enable passage of the gases. My method of sintering as described above is, therefore, a decided advance in the art of smelting phosphate rock in the electric furnace of the type proposed.

At the same time the method of sintering eliminates carbon dioxid, fluorin and chlorin outside of the furnace, to a very considerable extent. This greatly simplifies the collection of the valuable phosphoric acid in a suitable collection system and produces a much more pure and valuable phosphoric acid. My sintering process described above, in addition to affecting a physical structure of the material with which I must work, and putting the same into usable form in the shaft furnace, also affects its chemical composition and enables me to handle my gas with much more effectiveness.

What I claim is:—

1. The process of extracting phosphoric acid which consists in providing a mixture of phosphatic particles and silicious particles of the run of the mine sizes, sintering the constituents of said mixture together to form a porous mass; charging said mass with carbon into an electric furnace; subjecting said porous mass to a temperature sufficient to evolve the phosphorus present; and recovering said phosphorus, substantially as described.

2. The process of producing phosphoric acid, which consists in providing a suitably proportioned mixture of phosphate rock and silicious particles of the sizes as they come from the mine; adding carbon thereto; igniting said carbon to sinter or agglomerate said material and to form a porous charge material; subjecting the sintered mixture thus produced to the temperature of an electric furnace in the presence of carbon to evolve the phosphorus present and recovering the product, substantially as described.

3. The process of producing phosphoric acid, which consists in providing a suitably proportioned mixture of phosphate rock and silicious material of the run of the mine sizes; adding substantially sufficient carbon thereto to furnish sufficient heat upon combustion to sinter said constituents together; igniting said carbon to form a porous charge material in large irregular masses; adding carbon to said material; subjecting the mixture thus produced to the temperature of an electric furnace to evolve the phosphorus present; burning the evolved gases in contact with the oncoming charge to preheat the same; and recovering the product, substantially as described.

4. The process of sintering phosphatic charge material in the sizes it comes from the mine which consists in suitably proportioning said material with silica; adding carbon thereto sufficient to sinter the constituents together upon burning the same but insufficient to evolve the phosphorus present; and igniting said carbon to form a porous mass, substantially as described.

5. The process of sintering together the constituents of a charge of phosphatic material in the sizes it comes from the mine which consists in adding carbonaceous material thereto while in a wet condition, and subjecting the mixture in the presence of air to a temperature sufficient to form a porous mass suitable for smelting in an electric furnace, substantially as described.

6. The process of sintering together the constituents of a charge of phosphatic material which consists in adding carbon to masses of said material of irregular sizes as it comes from the mine; and directing heat upon said mixture until a porous sintered mass suitable for smelting in an electric furnace is formed, substantially as described.

7. The process of sintering together the constituents of a charge of phosphatic material by the burning of carbonaceous material which consists in placing a layer of said phosphatic material in irregular lumps as it comes from the mine upon a layer of carbonaceous material; blowing air through the layers thus formed and igniting said carbonaceous material to form a porous sintered mass suitable for charging into an electric furnace, substantially as described.

8. The process of preparing a charge of porous phosphate material for subsequent smelting in an electric furnace which consists in mixing said material in lumps of irregular sizes as it comes from the mine with a fuel; burning said fuel to drive off the fluorin and carbon dioxid present and to form a porous sintered agglomerated mass; and mixing said sintered mass with sufficient carbon to liberate substantially all the phosphorus present when heated in an electric furnace, substantially as described.

In testimony whereof I affix my signature.

FRANK S. WASHBURN.